(12) United States Patent
Trivellato et al.

(10) Patent No.: US 12,356,190 B2
(45) Date of Patent: *Jul. 8, 2025

(54) ADAPTIVE SCANNING

(71) Applicant: FORESCOUT TECHNOLOGIES, INC., San Jose, CA (US)

(72) Inventors: Daniel Trivellato, Eindhoven (NL); Kairo Francisco de Araujo, Eindhoven (NL)

(73) Assignee: Forescout Technologies, Inc., San Jose, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 18/158,247

(22) Filed: Jan. 23, 2023

(65) Prior Publication Data

US 2023/0156471 A1 May 18, 2023

Related U.S. Application Data

(63) Continuation of application No. 16/450,697, filed on Jun. 24, 2019, now Pat. No. 11,595,818.

(51) Int. Cl.
*H04W 12/08* (2021.01)
*H04L 9/40* (2022.01)
*H04W 8/00* (2009.01)
*H04W 48/16* (2009.01)
*H04W 80/00* (2009.01)
*H04W 88/08* (2009.01)

(52) U.S. Cl.
CPC .......... *H04W 12/08* (2013.01); *H04W 8/005* (2013.01); *H04W 48/16* (2013.01); *H04W 80/00* (2013.01); *H04W 88/08* (2013.01); *H04L 63/14* (2013.01)

(58) Field of Classification Search
None
See application file for complete search history.

(56) References Cited

U.S. PATENT DOCUMENTS

| 8,196,199 B2 * | 6/2012 | Hrastar .............. H04L 63/1408 726/22 |
| 8,599,767 B2 * | 12/2013 | Walton ................ H04W 48/16 370/348 |
| 9,094,898 B2 * | 7/2015 | Walton ................ H04W 48/16 |
| 2006/0085543 A1 | 4/2006 | Hrastar et al. |
| 2009/0323609 A1 | 12/2009 | Walton |

(Continued)

*Primary Examiner* — Wutchung Chu
*Assistant Examiner* — Berhanu D Belete
(74) *Attorney, Agent, or Firm* — Womble Bond Dickinson (US) LLP (57) ABSTRACT

Adaptive scanning is described. The adaptive scanning may include performing a passive scan of communications associated with a device, where the passive scan comprises observing one or more communications of the device over a network. One or more attributes associated with the device based on the passive scan are determined and an active scan of the device is performed based on the one or more attributes based on the passive scan. The active scan is customized for the device based on the one or more attributes determined based on the passive scan and the active scan comprises sending one or more requests to the device. One or more attributes associated with the device may be determined based on the active scan. The one or more attributes based on the passive scan and the one or more results based on the active scan associated with the device are stored.

20 Claims, 6 Drawing Sheets

(56) References Cited

U.S. PATENT DOCUMENTS

| | | |
|---|---|---|
| 2011/0075589 A1* | 3/2011 | Bradley ................ H04W 48/16 |
| | | 370/254 |
| 2013/0035110 A1 | 2/2013 | Sridhara et al. |
| 2013/0227714 A1 | 8/2013 | Gula et al. |
| 2014/0013434 A1 | 1/2014 | Ranum et al. |
| 2014/0087727 A1* | 3/2014 | Walton ................ H04W 48/16 |
| | | 455/434 |
| 2014/0362420 A1 | 12/2014 | Borges et al. |
| 2015/0019718 A1 | 1/2015 | Jeong et al. |
| 2015/0281259 A1* | 10/2015 | Ranum ................ G06F 21/564 |
| | | 726/24 |
| 2015/0309610 A1 | 10/2015 | Rabii et al. |
| 2015/0341850 A1* | 11/2015 | Borges .............. H04W 52/0229 |
| | | 370/329 |
| 2015/0358777 A1 | 12/2015 | Gupta |
| 2015/0358980 A1 | 12/2015 | Hara |
| 2016/0285827 A1* | 9/2016 | Gula .................. H04L 63/1408 |
| 2017/0019425 A1 | 1/2017 | Ettema et al. |
| 2017/0280301 A1 | 9/2017 | Chang et al. |
| 2017/0314534 A1 | 11/2017 | Gupta et al. |
| 2017/0324776 A1 | 11/2017 | Seger et al. |
| 2018/0013854 A1 | 1/2018 | Woronka |
| 2018/0019971 A1* | 1/2018 | Gula .................. H04L 63/0876 |
| 2018/0035245 A1 | 2/2018 | Thanayankizil |
| 2018/0139104 A1* | 5/2018 | Seddigh ................ H04L 41/12 |
| 2018/0310232 A1 | 10/2018 | Satyanarayana |
| 2018/0332069 A1 | 11/2018 | Moore et al. |
| 2019/0089719 A1* | 3/2019 | Ranum .................. H04L 67/10 |
| 2020/0053831 A1 | 2/2020 | Park et al. |
| 2020/0137102 A1 | 4/2020 | Sheridan et al. |
| 2020/0221296 A1 | 7/2020 | Jiang et al. |

* cited by examiner

ADAPTIVE SCANNING

RELATED APPLICATIONS

This application is a continuation of U.S. patent application Ser. No. 16/450,697, filed on Jun. 24, 2019, which is herein incorporated by reference in its entirety.

TECHNICAL FIELD

Aspects and implementations of the present disclosure relate to network monitoring, and more specifically, scanning of systems and resources communicatively coupled to a network.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to adaptive scanning using one or more techniques to scan one or more network environments with minimal to no negative impact. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Accordingly, described herein in various implementations are systems, methods, techniques, and related technologies, which allows for scanning using one or more scanning techniques in a manner adaptively customized for the entities of a network environment with minimal impact.

Most asset management, vulnerability management, risk management, and compliance programs necessitate organizations having a current inventory of the devices on their network. Understanding device configuration, vulnerabilities, attack surface, and the current risk level of their devices allow chief information security officers (CISOs), engineers, other security personnel, and others to ensure that their network and assets are on track to achieve optimal operational efficiency, that risk has been mitigated per policy, and that all information is available for compliance audits.

Active scanning can further be useful for scanning assets in order to: enumerate each entity (IT, OT, switches, firewalls, etc.), understand each entity's configuration and compare the configuration with the desired configuration, understanding the security posture of each entity (e.g., vulnerabilities, etc.) and determining whether action is needed (e.g., updating the device software/firmware, installing some patches, changing firewall rules or switch ACL, etc.).

Collecting of this information is a resource intensive task and necessitates active scans of devices, since passive scanning technologies may not return each piece of information needed for compliance. For example, passive scanning may not be able to determine each of the open ports of a device.

As an example standard, the North American Electric Reliability Corporation Critical Infrastructure Protection (NERC CIP) standard is a set of requirements designed to secure assets required for operating North America's bulk electricity system. In some cases, the verifications for compliance are done by hand by going to each remote location with devices every 35 days. Compliance with NERC CIP standard is thus very costly and time consuming for large power companies. Other standards such as ISO 27000, NIST standards, other network security related standards, asset management standards, and other technology related standards may require substantial resources to ensure compliance with those standards. For example, asset management standards, corporate policies, etc., may require an up to date asset management inventory and evidence for each asset.

Operational Technology (OT) can include devices from a wide variety of industries, including, but not limited to, medical systems, electrical systems (e.g., power generation, power distribution, and other power utility devices and infrastructure), oil and gas plants, mining facilities, manufacturing systems, water distribution systems, chemical industry systems, pharmaceutical systems, infrastructure systems (e.g., used with roads, railways, tunnels, bridges, dams and buildings), and other industrial control systems.

Certain environments, such as operational technology (OT) environments, include critical devices that are often very sensitive to active scanning. For example, OT devices may have limited computational, memory, and other resources and quickly become overloaded when multiple requests are issued within a short period of time and then slow down or become non-responsive (e.g., crash). The results of active scanning can thus have a high impact including stopping output production (e.g., of a factory or fuel system), stopping critical components, reducing or limiting the effectiveness of safety systems, result in significant injury or death to a person or animal, and cost significant amount of money due to down time. For example, if a safety PLC becomes overloaded thereby preventing an alarm from activating or preventing an elevator from stopping at the right location or operating at a safe speed, there can be significant danger to the workers of a site or building. The average cost of unplanned downtime is estimated to be approximately $260,000 per hour. The result has been that active scanning is not performed traditionally in these environments because of the risk associated with active scanning.

Embodiments are able to perform adaptive active scans on a variety of devices (e.g., OT devices, medical devices, etc.) that require carefully crafted scan types and techniques. Analysis of one or more network environments using passive scanning to gather information may be used to selectively perform active scanning in a targeted manner. The targeted manner allows for active scanning to be performed in a non-invasive, non-disruptive, or non-harmful manner. Embodiments are thus able to advantageously provide more information safely about more devices in more environments. Embodiments can be used be in a variety of environments including, but not limited to, campus, data center, cloud, medical, and operational technology or industrial environments.

Embodiments may perform passive monitoring of communications on a network to determine if a device is an IT device or OT device (e.g., based on a MAC address portion, for instance, an organizational unique identifier (OUI) or vendor), used ports, and communication protocols used by a device, etc. For OT devices, the device type (e.g., programmable logic controller (PLC), human-machine interface (HMI) device, engineering workstation, supervisory control and data acquisition (SCADA) device may be determined based on the passively gathered information. Embodiments may further determine the vendor or model based on the device type and other information (e.g., information gathered from the passive monitoring). Embodiments may then perform based on the particular device type, vendor and model of a device, or a combination thereof, one or more particular active scans.

In some embodiments, the monitoring of communications, device type determination, and vendor or model determination may be based on passive scanning, increasingly targeted active scans, or a combination thereof. For example, a generic active scan may be performed to determine active devices, then a slightly more specific active scan for device types may be performed, then a slightly more specific active scan for vendor and model may be performed.

Embodiments are able to use a combination of passively gathered information, minimally invasive active scanning, or a combination thereof to perform more targeted and safe active scanning of one or more network devices. Embodiments thus advantageously provide more information about entities on one or more networks than passive only methodologies. Embodiments thereby enable verifications for compliance to be automated, scheduled and performed remotely (e.g., NERC CIP verifications) thereby saving users large amounts of time and money. The information gathered can be used for compliance, configuration management or change management, device compliance, security, asset management, etc. For example, for asset management, an alert may be raised if an IP address is associated with a device that changes from Windows™ 7 to Windows™ XP.

In addition, embodiments are well placed to satisfy increasingly sophisticated standards and information requirements by enabling customized active scanning in sensitive environments. Embodiments further enable users to automate labor and time intensive compliance procedures that require gathering large amounts of information. The effort required for asset inventory may thus be reduced substantially because embodiments are able to automate manual tasks required to determine asset inventory and other compliance information.

An entity or entities, as discussed herein, include devices (e.g., computer systems, for instance laptops, desktops, servers, mobile devices, IoT devices, OT devices, etc.), network devices or infrastructure (e.g., firewall, switch, access point, router, enforcement point, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service).

Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

Embodiments may perform active scans of network devices or entities including switches, routers, firewalls etc., to gather configuration information, to enforce actions, or a combination thereof. For example, active scans of a network entity can enable actions such as changing firewall rules or a switch ACL. The active scans of network entities may also allow gathering information on entities communicatively coupled to the network entities (e.g., ARP table information, MAC address information, etc.).

Advantageously, embodiments are configured for avoiding costly and labor intensive information gathering processes for asset management, compliance procedures, security related information, etc. That is, embodiments enable better use of compliance and security resources within an organization. Resources are thus made available by embodiments to focus on responding to security threats and reducing risk.

Accordingly, described herein in various implementations are systems, methods, techniques, and related technologies, which may perform adaptive scanning. As described herein, various combinations of passive and active scans can be used to gather information about entities on a network.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Figure 1:
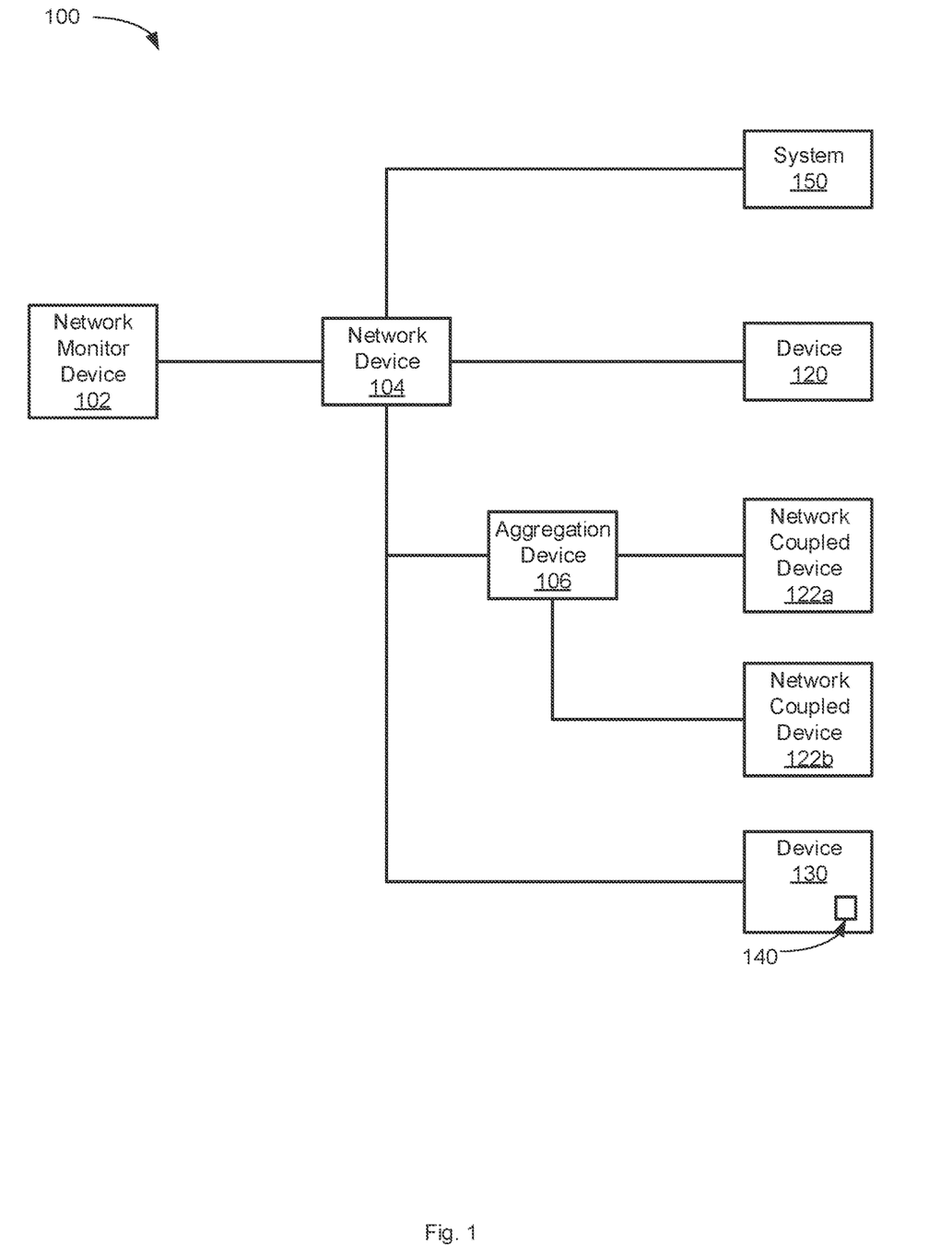
FIG. 1 depicts an illustrative communication network in accordance with one implementation of the present disclosure.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including perform adaptive scanning including one or more passive scans, determining one or more attributes based on the one or more passive scans, and one or more active scans based on the one or more attributes determined based on the one or more passive scans, as described herein.

Network monitor device 102 may provide an interface (e.g., a graphical user interface (GUI)) for viewing, monitoring, modifying, and implementing adaptive scanning. In some embodiments, network monitor device 102 is operable to perform visualization (e.g., including tables or matrixes) of passive and active scanning, for instance, scanning progress and information gathered. Network monitor device 102 may further monitor network traffic over a period of time (e.g., user configurable) to gather information passively, which may then be used to customize one or more active scans, as described herein.

Network monitor device 102 may further perform a variety of operations including identification, classification, and taking one or more remediation actions (e.g., changing network access of an entity, changing the virtual local area network (VLAN), sending an email, sending a short message service (SMS) message, etc.).

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be an enforcement point including, but not limited to, a router, firewall, switch, hypervisor, software-defined networking (SDN) controller, virtual firewall, a next generation firewall (NGFW), cloud infrastructure, or other network device or infrastructure device.

Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), standard and proprietary OT protocols, other proprietary protocols, etc.

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for an entity. For example, a vulnerability assessment (VA) system may be queried to verify or check if an entity is in compliance and provide that information to network monitor device 102. External or $3^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122*a-b* on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122*a-b* and provide network access to network coupled devices 122*a-b*. Aggregation device 106 may further be configured to provide information (e.g., operating system, entity software information, entity software versions, entity names, application present, running, or both, vulnerabilities, patch level, etc.) to network monitor device 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor device 102. It is appreciated that log information may be particularly reliable for stable network environments (e.g., where the types of devices on the network do not change often). The log information may include information of updates of software of network coupled devices 122*a-b*.

Figure 2:
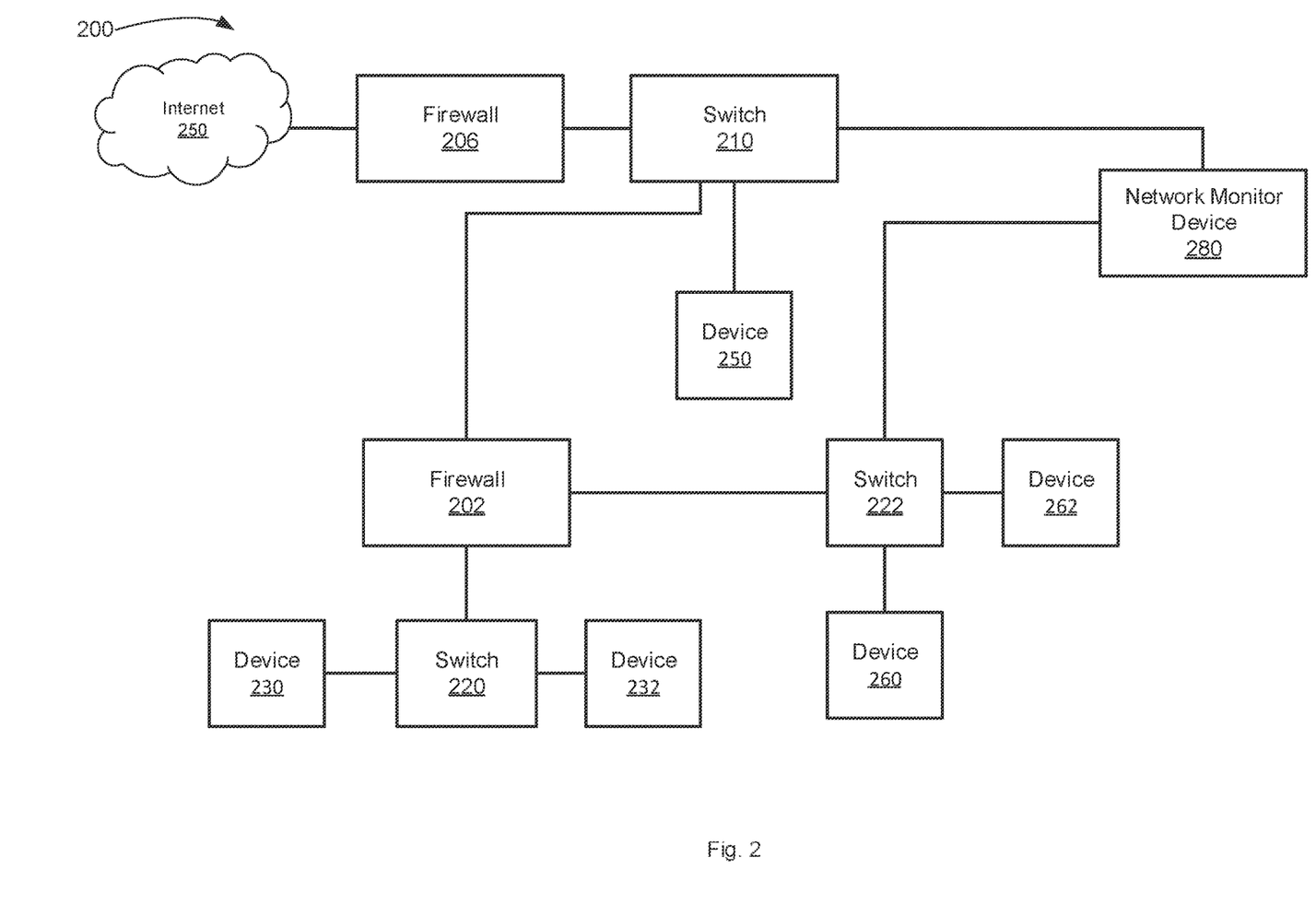
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewalls 202-206 and switches 210 and 220-222) and a network monitor device 280 (e.g., network monitor device 102) which may handle gathering information about the various devices communicatively coupled to example network 200. Network monitor device 280 can perform various passive scans, active scans, or combinations thereof, to gather information on the various devices communicatively coupled to example network 200. The information gathered by network monitor device 280 can be used for asset management, standards compliance, corporate policy compliance, security assessment, etc., as described herein.

FIG. 2 shows example devices 230-262 (e.g., devices 106, 122*a-b*, 120, and 130, other physical or virtual devices, etc.) and it is appreciated that more or fewer network devices or other entities may be used in place of the devices of FIG. 2. Example devices 230-262 may be any of a variety of devices (e.g., OT devices, IoT devices, IT devices, etc.), as described herein. For example, the enforcement points including firewalls 202-206 and switches 210 and 220-222 may be any entity (e.g., network device 104, cloud infrastructure, etc.) that is operable to allow traffic to pass, drop packets, restrict traffic, etc. Network monitor device 280 may be any of a variety of network devices, e.g., router, firewall, an access point, network access control (NAC) device, intrusion prevention system (IPS), intrusion detection system (IDS), deception device, cloud-based device, virtual machine based system, etc. Network monitor device 280 may be substantially similar to network monitor device 102. Embodiments support IPv4, IPv6, and other addressing schemes. In some embodiments, network monitor device 280 may be communicatively coupled with firewalls 202-206 and switches 210 and 220-222 through additional individual connections (e.g., to receive or monitor network traffic through firewalls 202-206 and switches 210 and 220-222).

Switches 210 and 220-222 communicatively couple the various devices of network 200 including firewalls 202-206, network monitor device 280, and devices 230-262. Firewalls 202-206 may perform network address translation (NAT) and firewall 202 may communicatively couple the devices 230-262, which are behind the firewall, with network monitor device 280, switch 210, and firewall 206. Firewall 206 communicatively couples network 200 to Internet 250 and firewall 206 may restrict or allow access to Internet 250 based on particular rules or ACLs configured on firewall 206. Firewalls 202-206 and switches 210 and 220-222 are enforcement points, as described herein.

Network monitor device 280 is configured to identify, classify, determine one or more characteristics of entities (e.g., devices 230-262), or a combination thereof on network 200, as described herein. Network monitor device 280 can access network traffic from network 200 (e.g., via port mirroring or switched port analyzer (SPAN) ports of firewalls 202-206 and switches 210 and 220-226). Network monitor device 280 can perform passive scanning of network traffic by observing and accessing portions of packets from the network traffic of network 200. Network monitor device 280 may perform an active scan of a device of network 200 by sending a request to the device of network 200.

Network monitor 280 may perform one or more passive scans of a device and use the information from the one or more passive scans to perform one or more active scans that are customized for a particular device. The customized active scan may be such that the requests, number of requests, spacing of the requests over time will be configured as to not negatively impact the device being actively scanned. For example, network monitor device 280 may monitor communications through switch 222 to determine a MAC address of device 262. The MAC address may then be used to determine that device 262 is made by Company A. Network monitor device 280 may further monitor the communication protocols used and ports used to determine that device 262 is a PLC. The active scans may include, but are not limited to, an Nmap™ scan, WMI requests for Windows™ operating system devices, SNMP, HTTP or HTTPs (e.g., for PLCs), proprietary protocols for PLCs, etc. WMI requests may be used to check if a specific file is in a specific location (e.g., an IOC) or request a list of the patches that are installed. A customized active scan, e.g., using a proprietary protocol or one or more SNMP requests, may be used to determine the firmware and hardware version of device 262.

In some embodiments, network monitor 280 may further perform one or more limited or generic active scans and use information gathered from those to perform more customized or targeted active scans of the device. An Nmap™ scan may be performed at various levels, for instance, starting generically with a ping scan, then more specific with types of port scans, determining which ports are open, and more specific scans using targeted scripts or parameters. For example, network monitor device 280 may perform an active scan of the opens ports of device 260 to determine which services are running on device 260. Network monitor device 280 may then use the open ports information to determine a device type for device 280 (e.g., PLC, HMI, SCADA device, etc.). A more customized active scan using an Nmap™ script or proprietary protocol may then be performed of device 260 to determine a firmware version. This firmware version may be compared to the latest firmware version available to ensure security compliance.

In some embodiments, network monitor 280 may further perform one or more passive scans in combination with one or more limited or generic active scans and use information from prior scans to perform more customized or targeted active scans. An Nmap™ scan may be performed at various levels, for instance, starting generically with a ping scan, then more specific with types of port scans, determining which ports are open, and more specific scans using targeted scripts. The opens ports of a device may be used to determine which services are running on the device, which may then be used to determine a device type for the device (e.g., PLC, HMI, SCADA device, etc.).

For example, network monitor device 280 may perform a passive scan including accessing network communications for device 250 and determine a vendor for device 250 (e.g., based on the MAC address having an OUI matching Company B) and a device type of SCADA based on the open ports of device 250. Network monitor device 280 may then perform a customized active scan using HTTPs to determine that the device is a Company B SCADA server Model 35000.

Figure 3:
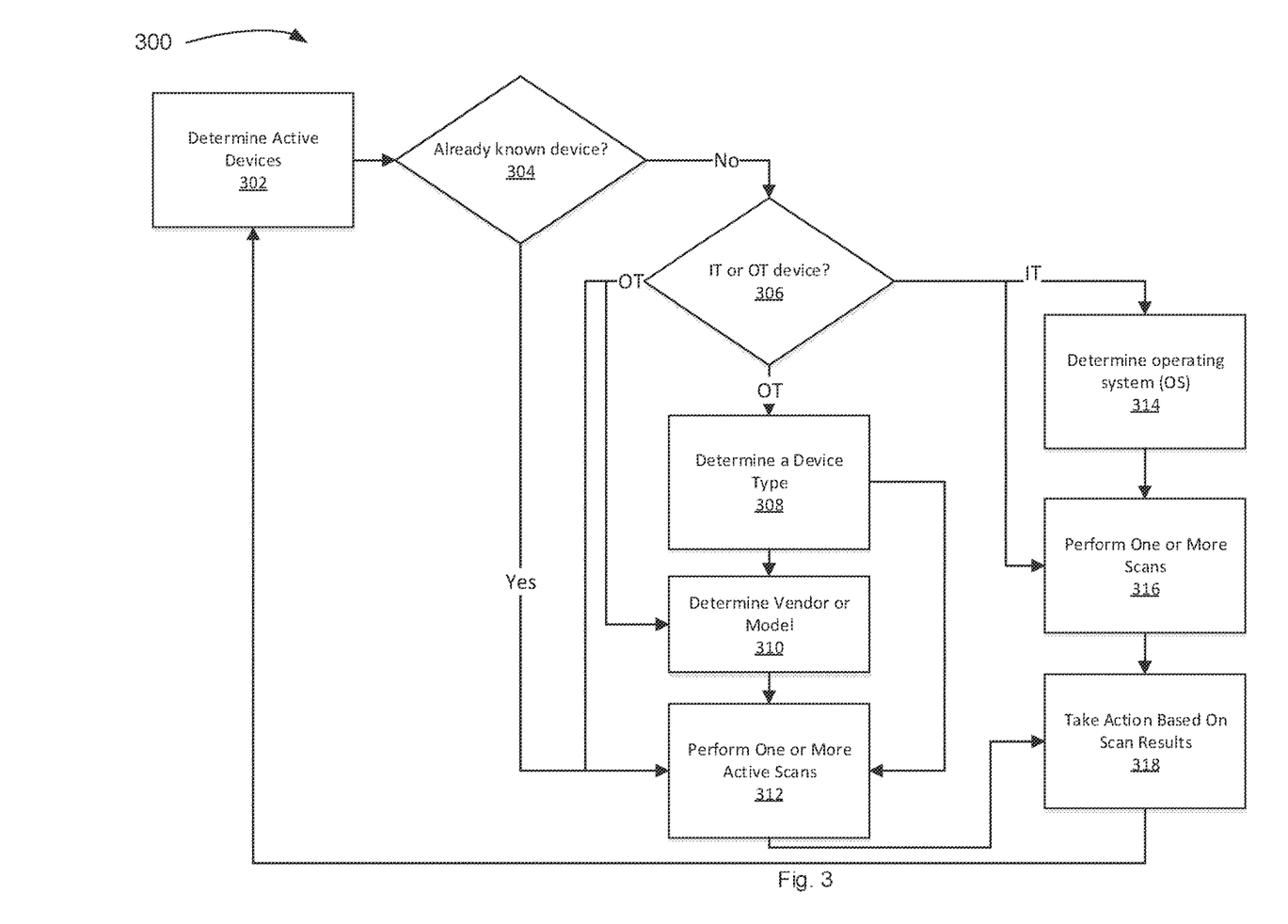
FIG. 3 depicts a flow diagram of aspects of a method for adaptive scanning in accordance with one implementation of the present disclosure.
Figure 4:
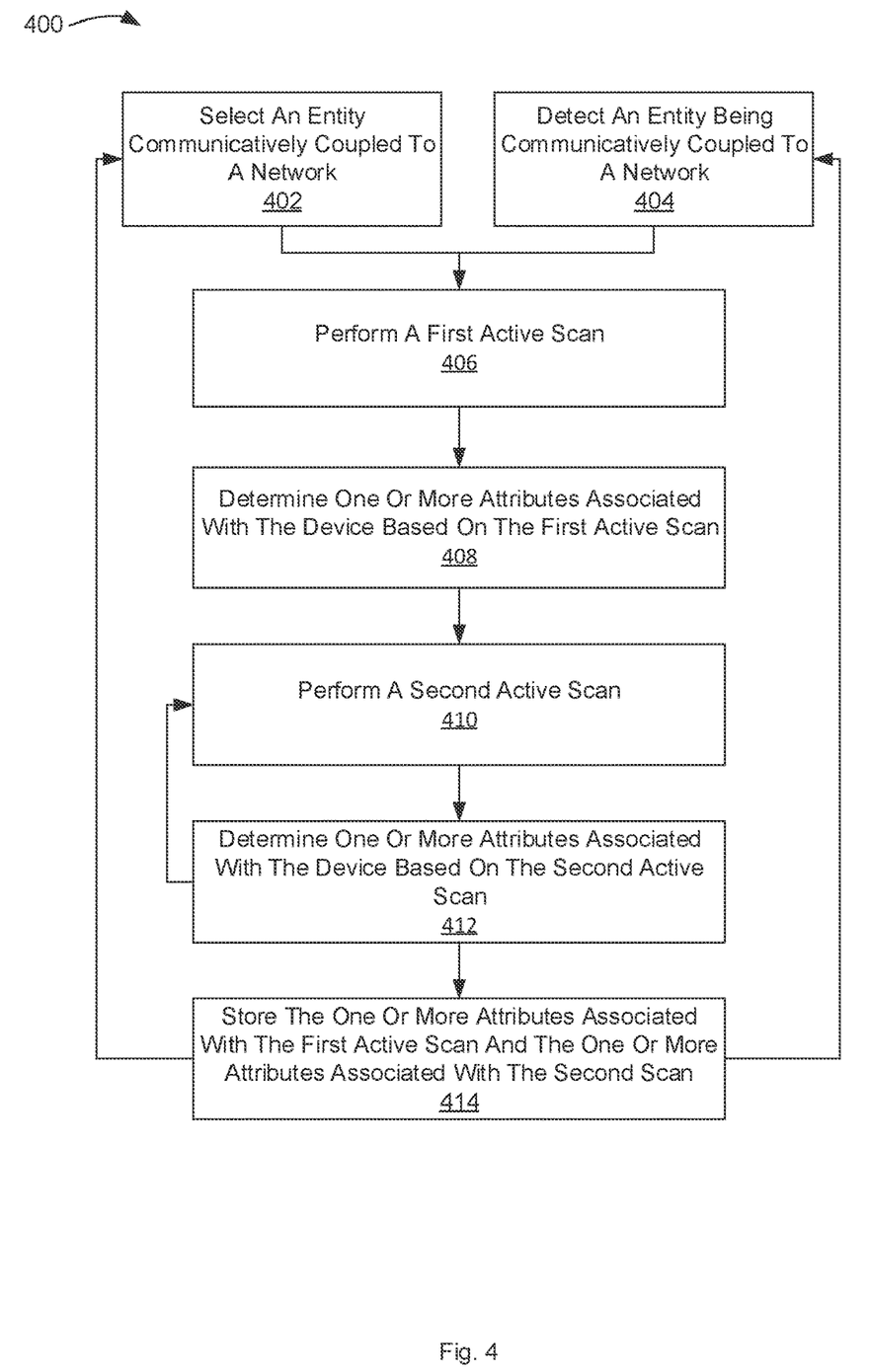
FIG. 4 depicts a flow diagram of aspects of a method for adaptive scanning including multiple active scans in accordance with one implementation of the present disclosure.

With reference to FIGS. 3-4, flowcharts 300 and 400 illustrates example operations used by various embodiments. Although specific operation blocks ("blocks") are disclosed in flowcharts 300-400, such blocks are examples. That is, embodiments are well suited to performing various other blocks or variations of the blocks recited in flowcharts 300-400. It is appreciated that the blocks in flowcharts 300-400 may be performed in an order different than presented, and that not all of the blocks in flowcharts 300-400 may be performed.

FIG. 3 depicts a flow diagram of aspects of a method for adaptive scanning in accordance with one implementation of the present disclosure. Various portions of flowchart 300 may be performed by different components (e.g., components of system 500) of an entity (e.g., network monitor device 102 or network monitor device 280). Flowchart 300 depicts a process for passively gathering information and then using the information for one or more customized active scans.

At block 302, active devices on a network are determined. In some embodiments, the active devices may be determined using passive scans or active scans. A device may be determined to be active based on one or more communications of the device being observed on the network (e.g., via a SPAN port). The active devices may also be determined passively based on observing communications of a device over a network or accessing network infrastructure (e.g., ARP table of a switch, router, or firewall). For example, when a device is communicatively coupled to the network, it may request an IP address via dynamic host configuration protocol (DHCP). Active devices may be determined using an active scan based on a ping scan of the network (e.g., sending a ping request to each IP address of the IP address range or subnet of the network). Active device could also be determined by querying network infrastructure (e.g., switches) for active devices.

At block 304, whether a device is already known is determined. Whether the device is already known, may also be based on prior scans, e.g., one or more previous scans (e.g., active scans, passive scans, etc.) upon a device being added to the network or during a periodic scan or based on an addressing scheme. For example, some manufactures uses an IP address scheme for particular device types, for instance, an IP address ending in 0.100 is an HMI device or an IP address ending in 0.1-10 for PLCs. Device information from other systems (e.g., system 150) or a previous scan performed by other systems could also be available. If a device is already known or information is already available, block 312 may be performed.

At block 306, whether the device is an IT device or an OT device is determined. This determination may be based on a MAC address (e.g., OUI portion of the MAC address) associated with the device, the ports the device uses to communicate (e.g., the ports used for communications observed on the network), the communication protocols used by the device, the content of those communications, etc. The MAC address may be accessed from a packet that is part of a communication that is observed or accessed from the network (e.g., via a SPAN port). Ports used by a device may be determined by observing or accessing the port information from one or more communications (e.g., on a switch cache). The communications protocols used by a device may further be used to determine if the device is an IT device or an OT device. For example, if a device uses a proprietary protocol associated with an OT vendor, the device can be determined to be an OT device. As another example, if the device use a Microsoft Windows' protocol, then the device can be determined to be an IT device.

In some embodiments, communications may also include device configuration information, firmware information, device serial number, hardware version, message information which can indicate the protocol and port that are being used for communication, etc., each of which may be used in determining whether a device is an IT device or an OT device.

The information determined from a passive scan can include, but is not limited to, VLAN (e.g., 50), IP address (e.g., 10.10.10.128), IP type (e.g., public/private), Nested address (e.g., 10.10.10.128:6/192.168.1.1), MAC addresses (e.g., AB:01:50:85:85:0D), MAC vendors (e.g., for each interface), Monitoring sensors (e.g., passive sensor 1, active sensor 2, etc.), IP reuse domain (e.g., 10.1.1.0/24 domain 1), Networks (e.g., subnet1, subnet 2, etc.), Host name (e.g., Controller1), All host names (e.g., Controller1, PLC-MAIN), Description (e.g., PLC for safety alarms), Role (e.g., PLC), All roles (e.g., PLC), Vendor/model (e.g., Emerson, 12P6190X042), All vendors/models (e.g., Emerson, 12P6190X042), OS version (e.g., Windows™ XP), Open port(s) (e.g., TCP 22, 1378, 1639, 1679, 3223, 3726, 3800, 4094, 4095, 4166, and 4347), Client protocol(s) (e.g., EtherNet/IP), Server protocol(s) (e.g., EtherNet/IP), Labels (e.g., production line1), Purdue level (e.g., LEVEL2), Criticality (e.g., 4), Firmware version (e.g., 2.03.04), Hardware version (e.g., 1.06.02), Serial number (e.g., 1234567), Project (e.g., quick packaging), Modules (e.g., 2 communication adapters, 1 redundancy module, etc.), First seen (e.g., Aug. 28 2018 11:36:36), Last seen (e.g., Jun. 6 2019 20:47:30), CVEs (e.g., CVE-2009-3739 (Medium—matches affected software/firmware)), NERC CIP classifications (e.g., low impact BES cyber systems), Software (e.g., Adobe, Microsoft office, etc.), and Patches (e.g., KB1234567).

In some embodiments, some of the above mentioned information may be determined based on active or passive scanning. Blocks 308, 310, 312, 314, or 316 may then be performed (e.g., based on the information available).

At block 308, a device type is determined. The device type may be determined to be a PLC, HMI, SCADA, etc. In some embodiments, the operating system of a device with an HMI device type may further be determined.

The content of the communications sent toward a device may be used to determine the device type of a device sending one or more requests and the device type of a device receiving or responding to the requests. For example, if a device receives read requests, commands (e.g., over a certain OT protocol), or a combination thereof, the device may be a PLC. A device that sends read requests, commands (e.g., over a certain OT protocol), write configuration commands to a device, reconfiguration commands, or a combination thereof, may be a SCADA device or an HMI device. For example, a SCADA server may request a PLC device provide status information and the PLC responds with a status information message. As another example, a PLC may send revolutions per minute data, temperature data, pressure data (e.g., in a pipe), whether valves are opened or closed, communications from a robot device.

If a device reads and writes data and includes a certain program application, then the device may be determined to be an HMI device. If a device reconfigures a PLC, it may be an engineering workstation.

In some embodiments, a device type may be determined based on the type of operations and commands it sends to another device. For example, a SCADA server could create trends on a PLC (e.g., to request the PLC to log and report some data).

In various embodiments, some of the above information may be determined based on active or passive scanning. Block 310 or 312 may then be performed (e.g., based on the information available).

At block 310, a vendor, model, or both associated with a device may be determined. Packet inspection including deep packet inspection can be used to determine specific model information for a device based on information in one or more packets. Firmware information and other device details, as mentioned with respect to block 306, may also be determined based on packet inspection.

For example, based on previous blocks (e.g., blocks 306-308), information about an OT device with a device type of PLC may have been determined. If the device type is a PLC, then vendor being Rockwell may be determined based on the MAC address, and the model may be ControlLogix 1756. The model may be determined based on upon a specific byte or bytes in a specific message type over a protocol that the vendor is known to use.

In some embodiments, some of the above information may be determined based on active or passive scanning.

At block 312, one or more active scans are performed. The active scans performed may be customized, targeted, or tailored to the device based on information from previous scans (e.g., based on blocks 302-310). In some embodiments, one or more active scans are customized based on a vendor, model, or both associated with a device. The information gathered from the one or more passive scans (e.g., blocks 306-310) may be used to make specific queries for specific parameters to retrieve more detailed or specific information associated with the device. The more detailed information could be used for compliance checks, configurations checks, security checks, etc. An active scan may include an Nmap™ scan, HTTP or HTTPS requests, SNMP requests, WMI requests, standard OT protocol requests, or proprietary protocol based requests, as described herein.

In some embodiments, the active scan may include sending a request that will trigger the device to send one or more communications (e.g., packets) to another device which will include information that can be used to further determine properties for the device. For example, an active scan may include a request that will result in the device sending a communication with firmware or configuration information to another device which may then be observed (e.g., by network monitor device 280), extracted from the communication, and used for further classifying, identifying, and monitoring of the device.

In some embodiments, an active scan can include a request over a proprietary protocol. For example, if a device is known a Rockwell PLC then the EtherNet/IP protocol can be used to send one or more requests to a Rockwell PLC to retrieve specific information.

For example, if a device is Siemens™ 1200 PLC, an active scan using a specific Nmap™ script or Step7 proprietary protocol may be initiated on a specific port (e.g., selected based on the device being the specific model of PLC) to fetch information, including the firmware and hardware version. Then a SNMP query may be initiated using a specific object identifier (OID) to fetch the uptime of the device. Alternatively, HTTP or HTTPs requests may be used to gather the aforementioned information from the device. In some embodiments, HTTP or HTTPs protocols may be used to check if the credentials of system have been changed from the default credentials. If the credentials have not been changed from the default credentials, then an alert of a possible security risk may be raised and this can be used for security and device compliance. In various embodiments, an active scan can be used to determine the SSL version that a device is using and determine if the device is using version of SSL that is up to date or safe.

In some embodiments, based on the information about the device, the device configuration can be checked against a stored or previously recorded configuration or master configuration. The check of configuration information may be performed regularly or in response to a device having been offline for a period of time (e.g., a period of time longer than a threshold) to ensure that the device has not been reconfigured in an unauthorized manner.

In various embodiments, some of the above mention information may be determined based on active or passive scanning.

At block 314, an operating system of the device is determined (e.g., based on the protocols used or network communications). In some embodiments, the operating system may be determined based on determining open ports (e.g., using Nmap™). It is appreciated that an active scan can be used with reduced risk since the device has been determined to be an IT device.

At block 316, one or more scans are performed (e.g., based on the operating system). The scans may be active scans based on the operating system of the device. The active scan may be customized based on the operating system of the device. For example, a scan based on WMI requests may be performed to gather information on a Windows' device.

At block 318, optionally, an action is taken based on the scan results. The action may include initiating a patching operation, closing one or more ports on the device, isolating or quarantining the device, updating the firmware of the device, sending or creating an alert, or other actions described herein.

FIG. 4 depicts a flow diagram of aspects of a method for adaptive scanning including multiple active scans in accordance with one implementation of the present disclosure. Various portions of flowchart 400 may be performed by different components (e.g., components of system 500) of an entity (e.g., network monitor device 102 or network monitor device 280). Flowchart 400 depicts a process for performing a generic or limited active scan and using information from the generic active scan to perform one or more customized active scans.

At block 402, an entity communicatively coupled to a network is selected. The entity may be selected as part of a periodic scan of the network (e.g., a scan of network 100 by network monitoring device 102). The entity may further be selected as part of a continuous, real-time, or combination thereof scan of the network. The entity may be a device, a user, etc., as described herein.

At block 404, an entity being communicatively coupled to the network is detected. The entity may be detected upon being communicatively coupled to the network (e.g., being communicatively coupled to network device 104 or other enforcement point). The detecting of the entity coupled to the network may include detecting the entity in response to the entity being recoupled or readmitted to the network. This may further include detecting that a user has logged into a machine or the active user account on a device has changed. In some embodiments, blocks 402, 404, or a combination thereof may be performed with blocks flowchart 300.

At block 406, a first active scan is performed. This active scan may be active scan that is generic with low impact (e.g., a small number of requests, requests that are spaced out over time, a combination thereof, etc.). For example, the active scan may include an Internet control message protocol (ICMP) ping command or request sent to each IP address within the IP address range of the subnet where a device is located. Based on the results of the ping scan, devices that are running or operative may be determined based on responding to the ping request. The MAC address may be contained in the ping response. A ping response will further populate the address resolution protocol (ARP) tables on network infrastructure from which the MAC address associated with an IP address can be determined. For example, a request may be sent to a switch for active entities communicatively coupled to the switch. Based on the MAC address the vendor of a device may be determined based on the OUI portion of the MAC address.

In some embodiments, an open port scan may be performed of devices (e.g., with the requests spaced over time based on a maximum number of parallel requests sent to a single device at a time) to determine the running services and operating system of a device. For example, if a device has TCP port 22 open, then the device may be have a Linux or Unix™ operating system. If the device has TCP port 3389 open, then the device may have a Windows' operating system. More advanced algorithms may be used to determine the device operating system, e.g., based on the formatting of the response.

In some embodiments, the first active scan is customized or targeted for the device based on information gathered as part of one or more passive scans (e.g., in a manner similar to that described with respect to FIG. 3).

At block 408, one or more attributes associated with the device are determined based on the first active scan. The attribute described herein, including vendor, model, device type, ports open, ports used, communication protocols used, whether a device is an IT device or an OT device, the operating system of the device, etc., may be determined from the results of the first active scan, as described herein.

At block 410, a second active scan is performed. The second active scan is customized based on the one or more attributes associated with the device based on the first active scan. In other words, the second active scan may be more customized, targeted, or narrow than the first active scan. The second scan can include an Nmap™ scan, HTTP or HTTPS requests, SNMP requests, WMI requests, standard OT protocol or proprietary protocol based requests, as described herein.

In some embodiments, the second active scan is customized or targeted based on based on information gathered as part of one or more passive scans (e.g., in a manner similar to that described with respect to FIG. 3).

At block 412, one or more attributes associated with the device are determined based on the second active scan. The one or more attributes including uptime, firmware version, hardware version, etc., may be determined from the second active scan. The one or more attributes determined may operable for more distinctly classifying or identifying the device.

In some embodiments, block 410 may then be performed to perform more customized or targeted scans of the device to determine more information (e.g., further attributes associated with the device) about the device using information gathered in the previous active scans.

At block 414, the one or more attributes associated with the first active scan and the one or more attributes associated with the second active scan (and other active scans) are stored. The attributes may be stored for use in conjunction with future scans, use for compliance, threat monitoring, security vulnerability monitoring, asset management, etc.

Figure 5:
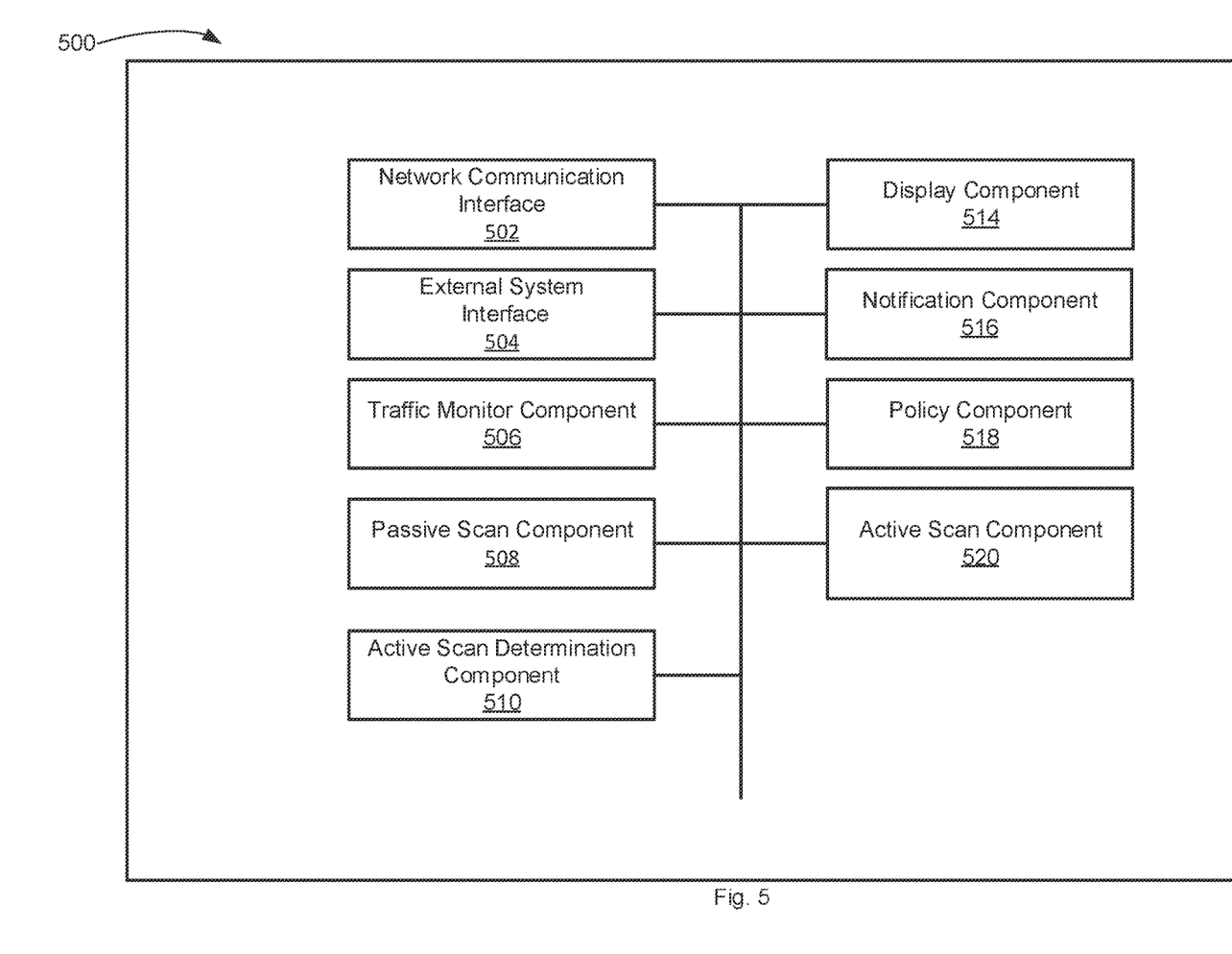
FIG. 5 depicts illustrative components of a system for adaptive scanning in accordance with one implementation of the present disclosure.

FIG. 5 illustrates example components used by various embodiments. Although specific components are disclosed in system 500, it should be appreciated that such components are examples. That is, embodiments are well suited to having various other components or variations of the components recited in system 500. It is appreciated that the components in system 500 may operate with other components than those presented, and that not all of the components of system 500 may be required to achieve the goals of system 500.

FIG. 5 depicts illustrative components of a system for adaptive scanning in accordance with one implementation of the present disclosure. Example system 500 or access manager 500 includes a network communication interface 502, an external system interface 504, a traffic monitor component 506, a passive scan component 508, active scan determination component 510, a display component 514, a notification component 516, a policy component 518, and an active scan component 520. The components of system 500 may be part of a computing system or other electronic device (e.g., network monitor device 102 or network monitor device 280) or a virtual machine or device and be operable to monitor and one or more entities communicatively coupled to a network, monitor network traffic, and perform passive and customized active scanning, as described herein. For example, the system 500 may further include a memory and a processing device, operatively coupled to the memory, which may perform the operations of or execute the components of system 500. The components of system 500 may access various data and characteristics associated with an entity (e.g., network communication information) and data associated with one or more entities. It is appreciated that the modular nature of system 500 may allow the components to be independent and allow flexibility to enable or disable individual components or to extend, upgrade, or combination thereof components without affecting other components thereby providing scalability and extensibility. System 500 may perform one or more blocks of flow diagrams 300-400.

Communication interface 502 is operable to communicate with one or more entities (e.g., network device 104, firewalls 202-206, switches 210 and 220-222, other devices coupled thereto, devices 230-262, etc.) coupled to a network that are coupled to system 500 and receive or access information about entities (e.g., device information, device communications, device characteristics, etc.), access information as part of a passive scan, send requests of an active scan, receive active scan results or responses (e.g., responses to requests), as described herein. The communication interface 502 may be operable to work with one or more components to initiate access to characteristics or determination of characteristics of an entity to allow determination of one or more attributes which may then be used for device compliance, asset management, standards compliance, etc., as described herein. Communication interface 502 may be used to receive and store network traffic for determining device attributes, as described herein.

External system interface 504 is operable to communicate with one or more third party, remote, or external systems to access information including characteristics or attributes about an entity. External system interface 504 may further store the accessed information in a data store. For example, external system interface 504 may access information from a vulnerability assessment (VA) system to enable determination of one or more compliance or risk characteristics associated with the entity. External system interface 504 may be operable to communicate with a vulnerability assessment (VA) system, an advanced threat detection (ATD) system, a mobile device management (MDM) system, a firewall (FW) system, a switch system, an access point (AP) system, etc. External system interface 504 may query a third party system using an API or CLI. For example, external system interface 504 may query a firewall or a switch for information (e.g., network session information) about an entity or for a list of entities that are communicatively coupled to the firewall or switch and communications associated therewith. In some embodiments, external system interface 504 may query a switch, a firewall, or other system for information of communications associated with an entity.

Traffic monitor component 506 is operable to monitor network traffic to determine if a new entity has joined the network or an entity has rejoined the network and monitor traffic for analysis by passive scan component 508, as described herein.

Passive scan component 508 is configured to perform analysis of network traffic (e.g., in real-time, with machine learning, etc.) to and from an entity (e.g., device) thereby determine one or more attributes (e.g., MAC address, ports used for communications, communication protocols used, vendor, model, etc.) associated with a device based on observation of traffic, as described herein. Passive scan component 508 may have a packet engine operable to access packets of network traffic (e.g., passively) and analyze the network traffic. The passive scan component 508 may further be able to access and analyze traffic logs from one or more entities (e.g., network device 104, system 150, or aggregation device 106) or from an entity being monitored. The passive scan component 508 may further be able to access traffic analysis data associated with an entity being monitored, e.g., where the traffic analysis is performed by a third party system. Information of passive scan component 508 may be stored, displayed, and used as a basis for customizing one or more active scans, or the like, as described herein.

Active scan determination component 510 is configured to determine one or more active scans to be performed for a particular device (e.g., based on one or more attributes determined by passive scan component 508), as described herein. For example, active scan component 510 can determine a proprietary protocol to be used for an active scan of a device, as described herein. Active scan determine component 510 may further be configured to determine one or more active scans to be performed for a particular device based on one or more attributes determined by active scan component 520), as described herein.

Active scan component 520 is configured to perform active scans of an entity or device and analysis of network traffic (e.g., in real-time, with machine learning, etc.) to and from an entity (e.g., device) based on one or more requests of an active scan and thereby determine one or more attributes (e.g., firmware, hardware version, etc.) associated with a device, as described herein. Active scan component 520 may have a packet engine operable to access packets of network traffic (e.g., packets sent in response to an active scan) and analyze the network traffic. Active scan component 520 may further be able to access traffic analysis data associated with an entity being actively monitored, e.g., where the traffic analysis is performed by a third party system. Information of active scan component 520 may be stored, displayed, and used as a basis for customizing one or more active scans, or the like, as described herein.

Display component 514 is configured to optionally display one or more graphical user interfaces or other interfaces (e.g., command line interface) for depicting various information associated with entities or devices, alerts, asset management, and compliance with standards and other policies, as described herein. In some embodiments, display component 514 may display or render a network graph of entities, attributes associated with each entity or device, and indications of security policy alerts, compliance alerts, etc.

Notification component 516 is operable to initiate one or more notifications based on the results of monitoring communications or attributes of one or more entities (e.g., alerting of a new device or attributes associated with a device that is not in compliance, etc.), as described herein. The notification may be any of a variety of notifications, e.g., IT ticket, email, SMS, a HTTP notification, etc., as described herein.

Policy component 518 is operable for initiating or triggering one or more remediation actions or security actions according to one or more policies, e.g., based on one or more device attributes, as described herein. Policy component 518 may further be configured to perform other operations including checking compliance status, finding open ports, etc. Policy component 518 may restrict network access, signal a patch system or service, signal an update system or service, etc., as described herein. The policy component 518 may thus, among other things, invoke automatically patching, automatically updating, and automatically restrict network access of an entity (e.g., that has out-of-date software or based on access rule violation or attempted violation).

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 500 may be software stored on a non-transitory computer readable medium having instructions encoded thereon that, when executed by a processing device, cause the processing device to perform a passive scan of communications associated with a device, where the passive scan comprises observing one or more communications of the device over a network. The instructions may further cause the processing device to determine one or more attributes associated with the device based on the passive scan and perform an active scan of the device based on the one or more attributes based on the passive scan. The active scan is customized for the device based on the one or more attributes based on the passive scan and the active scan comprises sending one or more requests to the device. The instructions may further cause the processing device to receive a response to the active scan of the device and determine, by the processing device, one or more attributes associated with the device based on the active scan. The instructions may further cause the processing device to store the one or more attributes based on the passive scan and the one or more results based on the active scan associated with the device.

In some embodiments, the instructions may further cause the processing device to select the device based on at least one of detecting the device being coupled to the network or accessing a communication of the device over the network. In various embodiments, the determining the one or more attributes associated with the device based on the passive scan comprises determining whether the device is an information technology (IT) or operational technology (OT) device. The determining whether the device is an IT device or an OT device is based on at least one of a media access control (MAC) address, one or more ports used by the device for communication, or one or more communication protocols used by the device.

In some embodiments, the determining the one or more attributes associated with the device based on the passive scan comprises and determining a device type of the device. The device type may comprise at least one of a programmable logic controller (PLC), a supervisory control and data acquisition (SCADA) device, or a human-machine interface (HMI) device. In various embodiments, the determining the one or more attributes associated with the device based on the passive scan comprises determining at least one of a vendor or model of the device.

In some embodiments, the active scan is customized for the device based on at least one of the device being an IT device or an OT device, a device type of the device, a vendor of the device, a model of the device, an operating system (OS) of the device, a configuration of the device, a firmware of the device, a hardware version of the device, or a proprietary protocol associated with the device. In various embodiments, the active scan comprises a request using at least one of a hypertext transfer protocol (HTTP) protocol, HTTP Secure (HTTPS) protocol, simple network management protocol (SNMP) protocol, an Nmap' scan, a standard OT protocol or a proprietary protocol associated with the device, or a windows management instrumentation (WMI). In some embodiments, the instructions may further cause the processing device to perform another active scan based on at least one of the one or more attributes based on the passive scan or the one or more results based on the active scan associated with the device, wherein the another active scan is more customized that the active scan.

Figure 6:
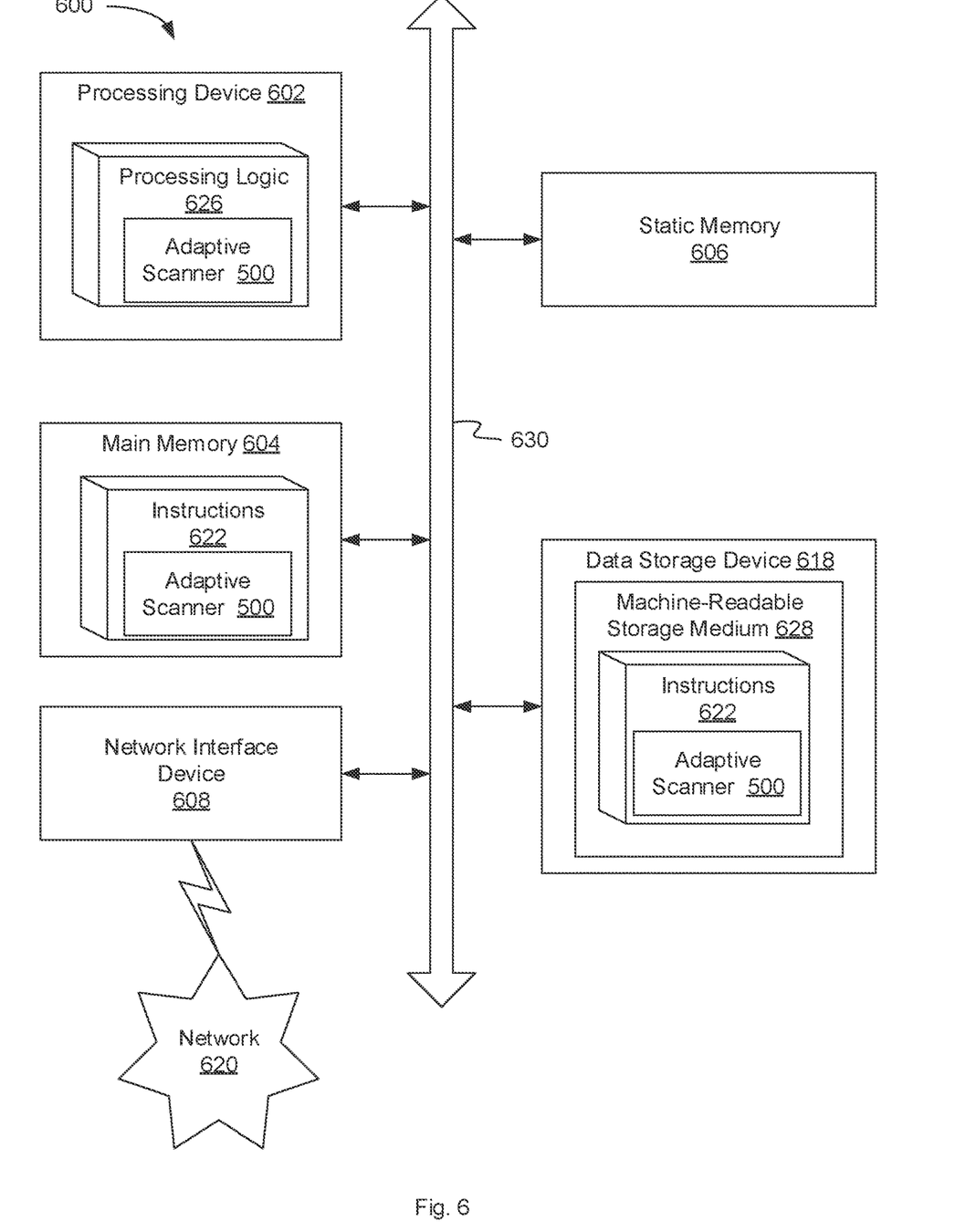
FIG. 6 is a block diagram illustrating an example computer system, in accordance with one implementation of the present disclosure.

FIG. 6 is a block diagram illustrating an example computer system, in accordance with one implementation of the present disclosure. FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as network monitor device 102 running adaptive scanner 500 to perform adaptive scanning including one or more passive scans, determining one or more attributes based on the one or more passive scans, and one or more active scans based on the one or more attributes based on the one or more passive scans, as described herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of adaptive scanner 500 shown in FIG. 5, for performing the operations and steps discussed herein.

The data storage device 618 may include a machine-readable storage medium 628, on which is stored one or more set of instructions 622 (e.g., software) embodying any one or more of the methodologies of operations described herein, including instructions to cause the processing device 602 to execute adaptive scanner 500. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for adaptive scanning, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   performing a passive scan of communications associated with a device, wherein the passive scan comprises observing one or more communications of the device over a network;
   determining one or more attributes associated with the device based on the passive scan;
   performing an active scan of the device based on the one or more attributes based on the passive scan, wherein the active scan is customized for the device based on the one or more attributes based on the passive scan, and wherein the active scan comprises sending one or more requests to the device;
   receiving a response to the active scan of the device;
   determining, by a processing device, one or more second attributes associated with the device based on the active scan; and
   storing the one or more attributes based on the passive scan and the one or more second attributes based on the active scan associated with the device.

2. The method of claim 1 further comprising:
   selecting the device based on at least one of detecting the device being coupled to the network or accessing a communication of the device over the network.

3. The method of claim 1, wherein the device type comprises a programmable logic controller (PLC).

4. The method of claim 1, wherein the determining the one or more attributes associated with the device based on the passive scan comprises:
   determining a device type of the device.

5. The method of claim 1, wherein the determining the one or more attributes associated with the device based on the passive scan comprises:
   determining at least one of a vendor, model, or firmware version of the device.

6. The method of claim 1, wherein the active scan is customized for the device based on at least one of the device being an IT device or an operational technology (OT) device, a device type of the device, a vendor of the device, a model of the device, an operating system (OS) of the device, a configuration of the device, a firmware of the device, a hardware version of the device, or a proprietary protocol associated with the device.

7. The method of claim 1, wherein the active scan comprises a request using at least one of a hypertext transfer protocol (HTTP) protocol, HTTP Secure (HTTPS) protocol, simple network management protocol (SNMP) protocol, an Nmap scan, a standard operational technology (OT) protocol or a proprietary protocol associated with the device, or a windows management instrumentation (WMI).

8. The method of claim 1, further comprising:
   performing another active scan customized using at least one of the one or more attributes based on the passive scan or the one or more second attributes based on the active scan associated with the device, wherein the another active scan is more customized that the active scan.

9. The method of claim 3, wherein the determining whether the device is an IT device or an operational technology (OT) device is based on at least one of a media access control (MAC) address, one or more ports used by the device for communication, or one or more communication protocols used by the device.

10. The method of claim 9, wherein the device type comprises at least one of a supervisory control and data acquisition (SCADA) device or a human-machine interface (HMI) device.

11. A system comprising:
    a memory; and
    a processing device, operatively coupled to the memory, to:
      perform a passive scan of communications associated with a device, wherein the passive scan comprises observing one or more communications of the device over a network;
      determine one or more attributes associated with the device based on the passive scan;
      perform an active scan of the device based on the one or more attributes based on the passive scan, wherein the active scan is customized for the device based on the one or more attributes based on the passive scan, and wherein the active scan comprises sending one or more requests to the device;
      receive a response to the active scan of the device;
      determine one or more second attributes associated with the device based on the active scan; and
      store the one or more attributes based on the passive scan and the one or more second attributes based on the active scan associated with the device.

12. The system of claim 11, wherein to determine the one or more attributes associated with the device based on the passive scan is based on at least one of a media access control (MAC) address, one or more ports used by the device for communication, or one or more communication protocols used by the device.

13. The system of claim 11, wherein to determine the one or more attributes associated with the device based on the passive scan the processing device to determine a device type of the device, and wherein the device type comprises at least one of a programmable logic controller (PLC), a supervisory control and data acquisition (SCADA) device, or a human-machine interface (HMI) device.

14. The system of claim 11, wherein the active scan is customized for the device based on at least one of a device type of the device, a vendor of the device, a model of the device, an operating system (OS) of the device, a configuration of the device, a firmware of the device, a hardware version of the device, or a proprietary protocol associated with the device.

15. The system of claim 11, wherein the active scan comprises a request using at least one of a hypertext transfer protocol (HTTP) protocol, HTTP Secure (HTTPS) protocol, simple network management protocol (SNMP) protocol, an Nmap scan, a standard operational technology (OT) protocol or a proprietary protocol associated with the device, or a windows management instrumentation (WMI).

16. The system of claim 11, wherein the processor further to:
perform another active scan based on at least one of the one or more attributes based on the passive scan or the one or more second attributes based on the active scan associated with the device, wherein the another active scan is more customized that the active scan.

17. A non-transitory computer readable medium having instructions encoded thereon that, when executed by a processing device, cause the processing device to:
perform a passive scan of communications associated with a device, wherein the passive scan comprises observing one or more communications of the device over a network;
determine one or more attributes associated with the device based on the passive scan;
perform an active scan of the device based on the one or more attributes based on the passive scan, wherein the active scan is customized for the device based on the one or more attributes based on the passive scan, and wherein the active scan comprises sending one or more requests to the device;
receive a response to the active scan of the device;
determine, by the processing device, one or more second attributes associated with the device based on the active scan; and
store the one or more attributes based on the passive scan and the one or more second attributes based on the active scan associated with the device.

18. The non-transitory computer readable medium of claim 17, wherein the active scan is customized for the device based on at least one of a device type of the device, a vendor of the device, a model of the device, an operating system (OS) of the device, a configuration of the device, a firmware of the device, a hardware version of the device, or a proprietary protocol associated with the device.

19. The non-transitory computer readable medium of claim 17, wherein the active scan comprises a request using at least one of a hypertext transfer protocol (HTTP) protocol, HTTP Secure (HTTPS) protocol, simple network management protocol (SNMP) protocol, an Nmap scan, a standard operational technology (OT) protocol or a proprietary protocol associated with the device, or a windows management instrumentation (WMI).

20. The non-transitory computer readable medium of claim 17, wherein the instructions when executed by the processing device, further cause the processing device to:
perform another active scan based on at least one of the one or more attributes based on the passive scan or the one or more second attributes based on the active scan associated with the device, wherein the another active scan is more customized that the active scan.

* * * * *